United States Patent [19]

Harwood et al.

[11] Patent Number: 4,943,014

[45] Date of Patent: Jul. 24, 1990

[54] SOFT RIDE METHOD FOR CHANGING THE ALTITUDE OR POSITION OF A SPACECRAFT IN ORBIT

[75] Inventors: Oliver P. Harwood, Huntington Beach; John A. Love, Seal Beach, both of Calif.

[73] Assignee: TRW Inc., Redondo Beach, Calif.

[21] Appl. No.: 338,468

[22] Filed: Apr. 14, 1989

Related U.S. Application Data

[60] Continuation of Ser. No. 170,190, Mar. 18, 1988, abandoned, which is a continuation of Ser. No. 916,907, Dec. 8, 1986, abandoned, which is a continuation of Ser. No. 769,635, Aug. 26, 1985, abandoned, which is a division of Ser. No. 407,379, Aug. 12, 1982, Pat. No. 4,575,029, which is a continuation of Ser. No. 89,349, Oct. 30, 1979, abandoned.

[51] Int. Cl.$^5$ .......................... B64G 1/26; B64G 1/10
[52] U.S. Cl. ................................ 244/158 R; 244/160; 244/169; 244/172
[58] Field of Search .................. 244/158 R, 160, 164, 244/169, 172, 161

[56] References Cited

U.S. PATENT DOCUMENTS

| | | | |
|---|---|---|---|
| 2,550,380 | 4/1951 | Redford | 244/135 R |
| 3,286,629 | 11/1966 | Laue | 244/172 |
| 3,295,790 | 1/1967 | Webb | 244/135 R |
| 3,652,042 | 3/1972 | Welther | 244/161 |
| 3,702,688 | 11/1972 | Faget | 244/155 |
| 3,753,536 | 8/1973 | White | 244/161 |
| 3,907,255 | 9/1975 | Welther | 244/158 |
| 4,009,851 | 3/1977 | Cable | 244/158 |
| 4,116,263 | 9/1978 | Genssle et al. | 244/158 |
| 4,213,586 | 7/1988 | Sengstock, Jr. et al. | 244/158 |
| 4,575,029 | 3/1981 | Harwood et al. | 244/172 |

FOREIGN PATENT DOCUMENTS

| | | |
|---|---|---|
| 1959282 | 11/1969 | Fed. Rep. of Germany . |
| 2753188 | 6/1978 | Fed. Rep. of Germany . |
| 2850920 | 6/1979 | Fed. Rep. of Germany ... 244/158 R |

OTHER PUBLICATIONS

U.S. Defensive Publication No. T100,604, Crill et al., May 5, 1981, effective filing date Nov. 25, 1977.
"Space Maneuvers", A. R. Tanguay, *Space Trajectories*, Academic Press, New York, 1960, pp. 163-172.
"Pioneer Venus Spacecraft Design and Operation", George J. Nothwang, IEEE Trans. Geoscience and Remote Sensing, vol. GE-18, No. 1, Jan. 1980.
"Space Shuttle", Division Rockwell Int. Space.
Rosen et al., "An STS-Optimized Spin Stabilized Satellite Concept", 25-5B-EASCON 77, Sep. 26-28, 1977.
Rosen, H. A. et al., "STS Optimized Satellite Concept", Astronautics and Aeronautics, pp. 48-53, Jun., 1977.

*Primary Examiner*—Joseph F. Peters, Jr.
*Assistant Examiner*—James M. Kannofsky

[57] ABSTRACT

A spacecraft, and related method for its operation, for transporting a payload, such as a satellite, from a space shuttle in a low-altitude parking orbit, to an operational orbit. Housekeeping functions, such as communications, attitude control, and power-supply, are performed by subsystems integrated into the spacecraft and employed both while in the operational orbit and during ascent from the parking orbit. The payload is secured forward of a payload platform having forward and aft faces of isogrid construction, and the housekeeping subsystems are stored between the faces, an interface of electrical and other connections being provided to the payload through the forward platform face. A liquid bipropellant rocket engine secured behind the payload platform provides low thrust and relatively low acceleration, and is operated in a succession of short perigee burns to extend the orbit to a desired altitude, and then in one or more apogee burns to circularize the orbit, if the payload is a satellite. Tanks of fuel and oxidizer are also secured behind the payload platform, disposed about the engine in balanced pairs, each oxidizer tank being paired with a fuel tank located further from the center of mass than the heavier oxidizer tank, to preserve balance as the pair of tanks is depleted. Propellants are fed to the engine from one tank pair at a time, each pair, or stage, being jettisoned when its contents are consumed.

10 Claims, 8 Drawing Sheets

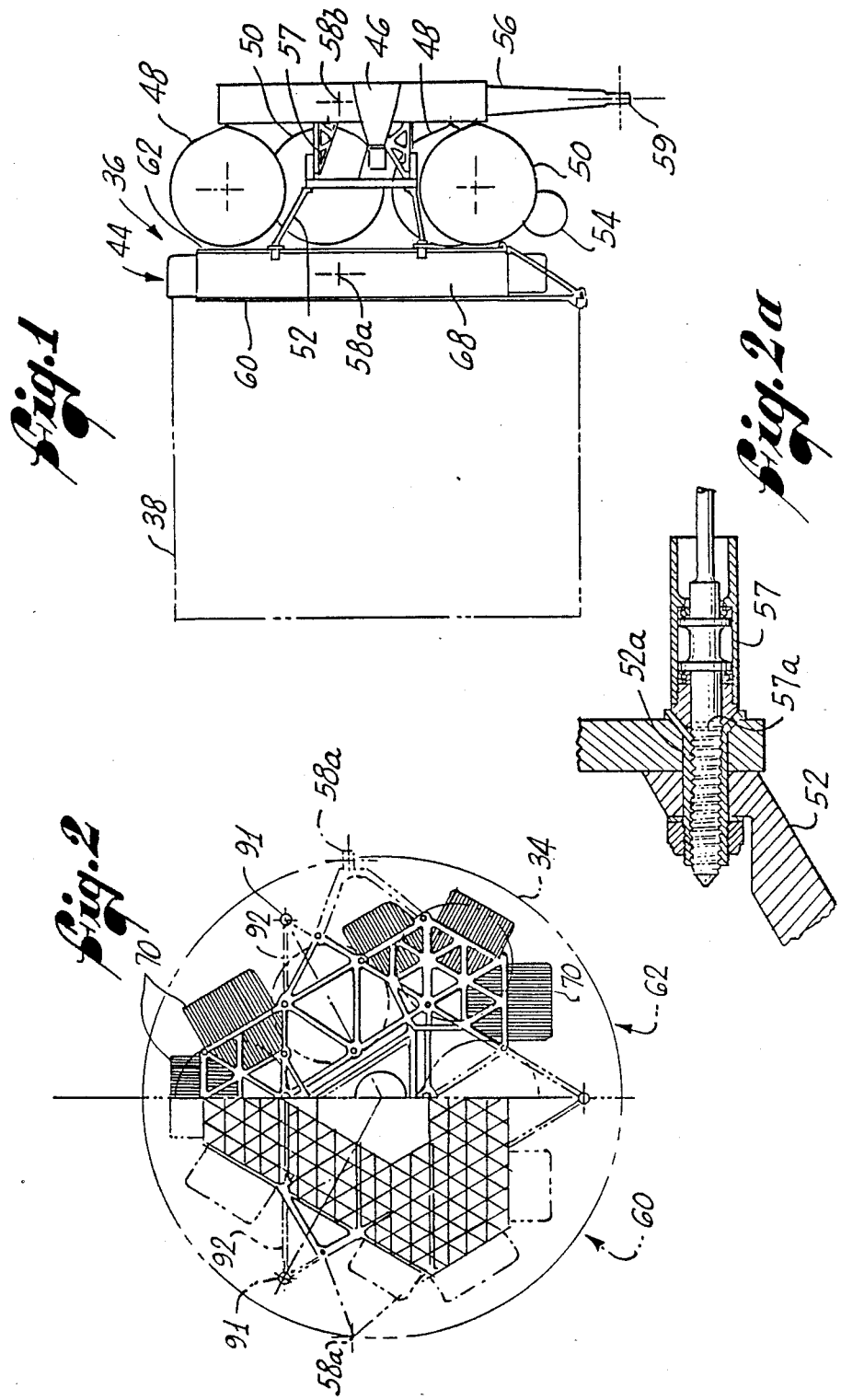

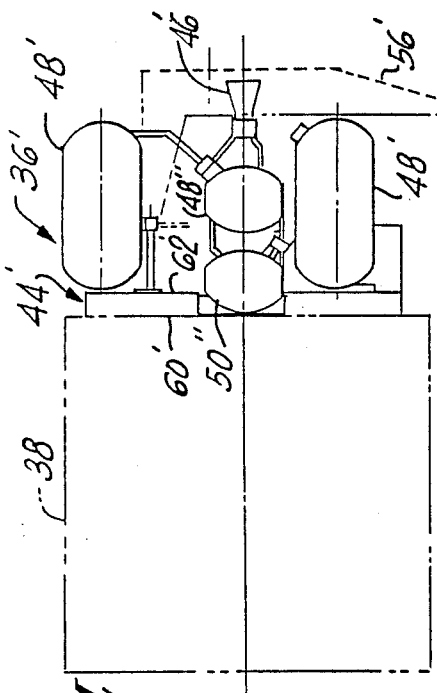
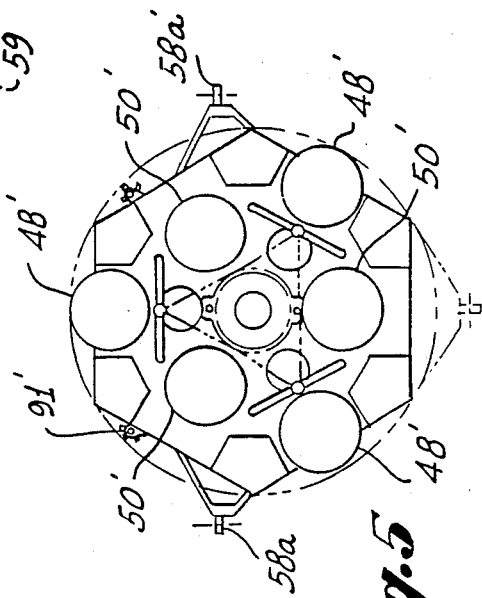
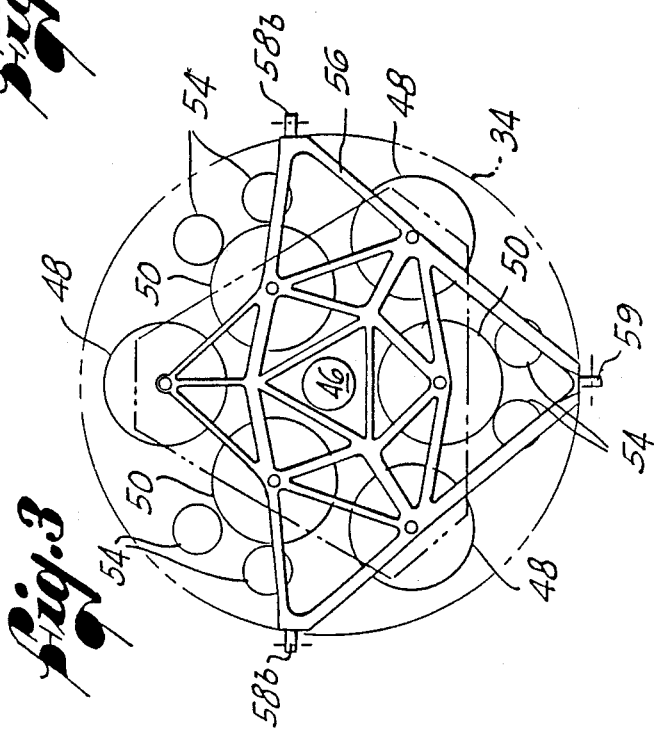

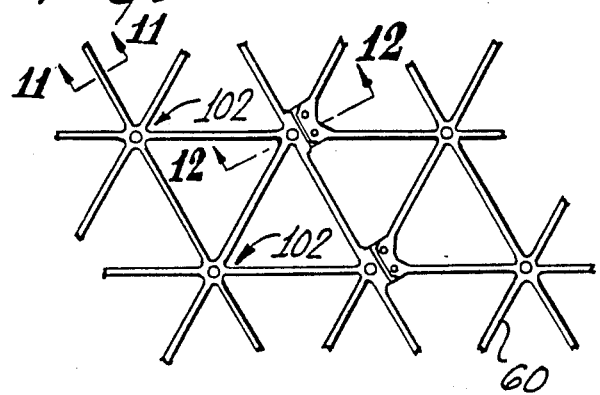
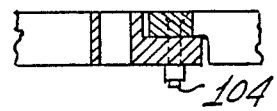
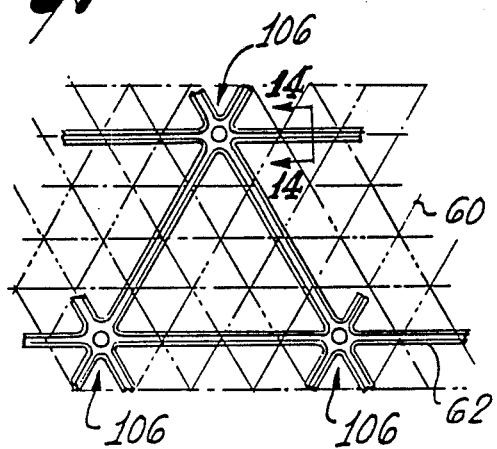
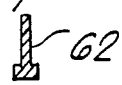
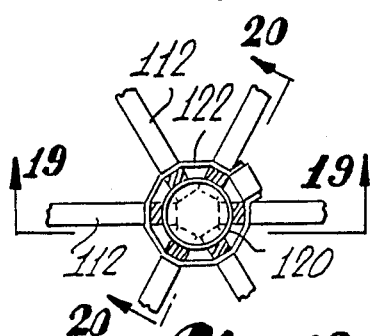
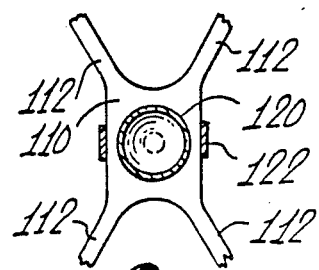
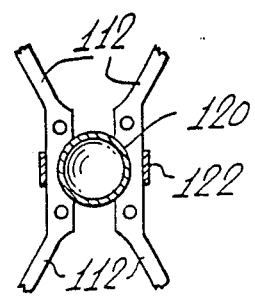

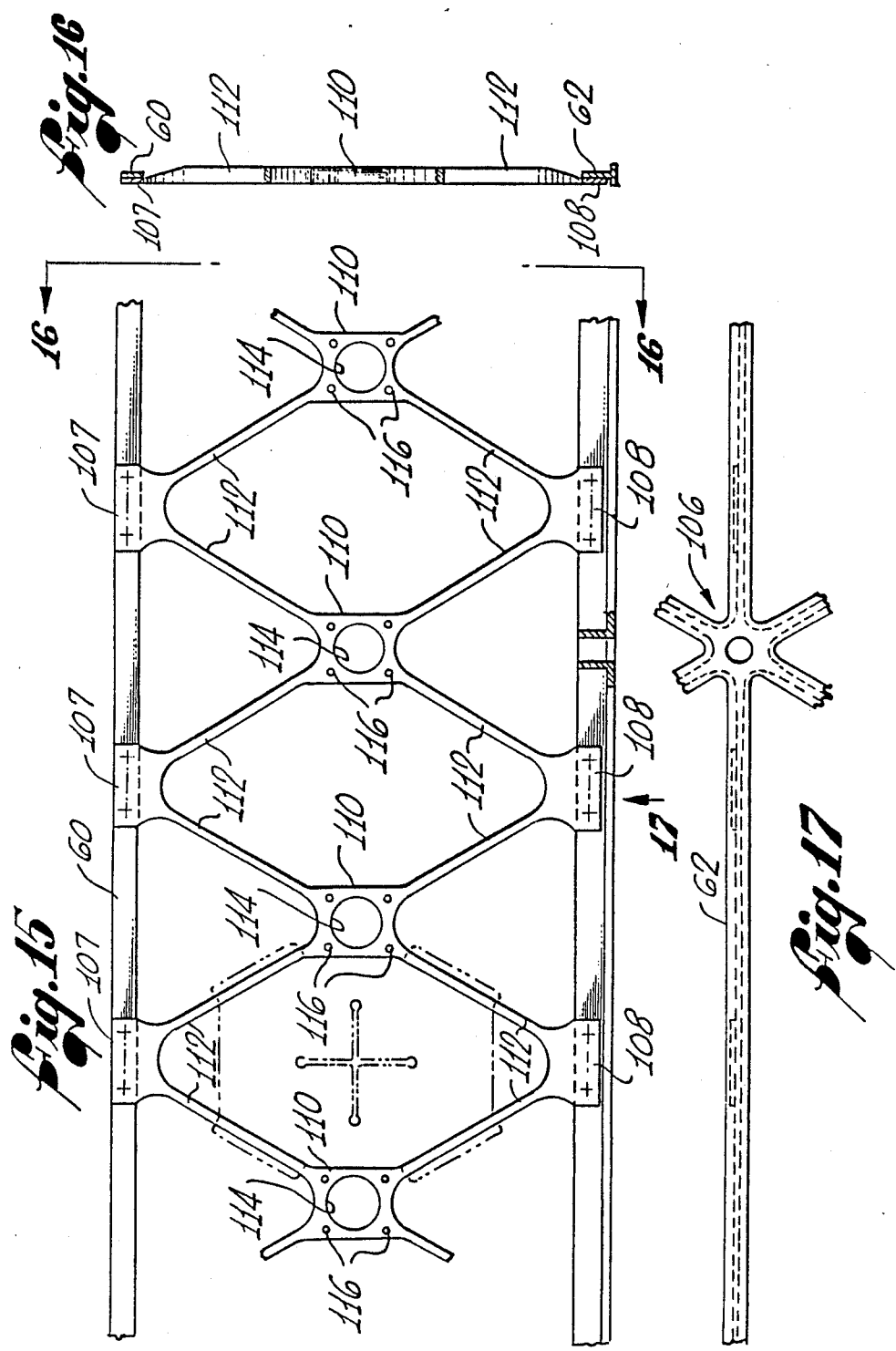

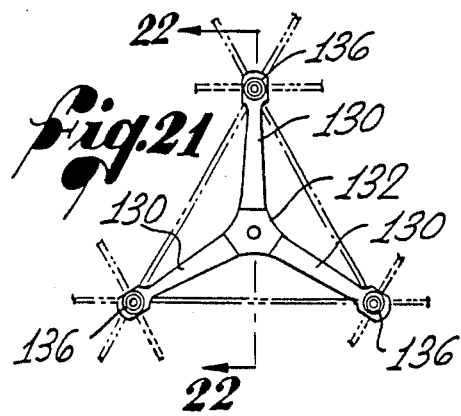
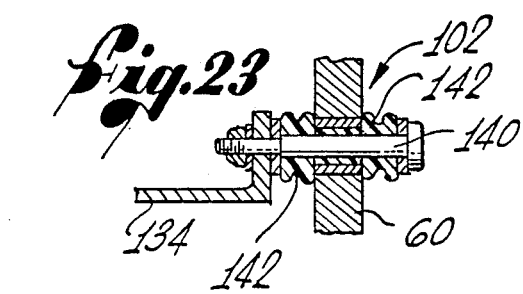
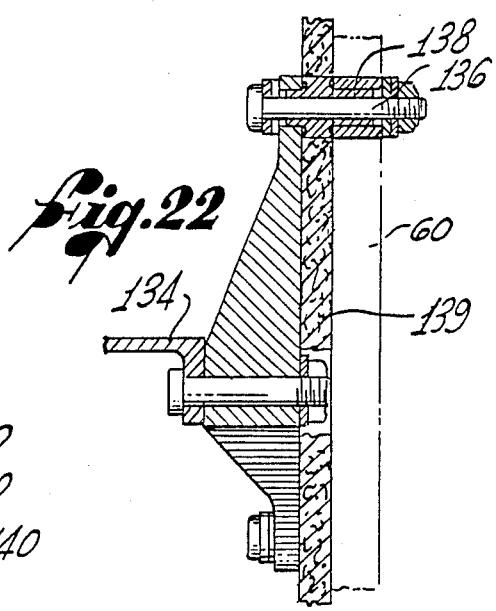
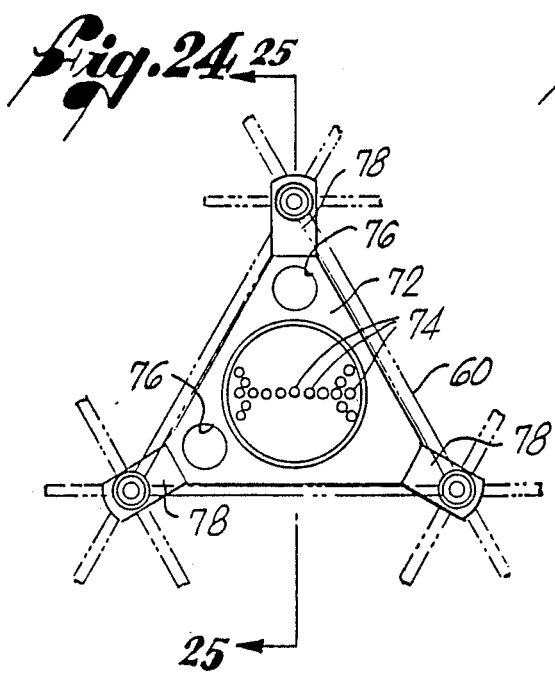
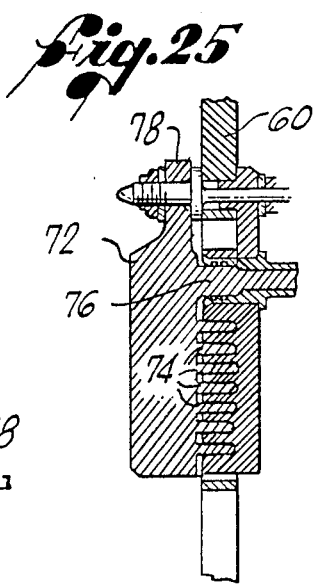

SOFT RIDE METHOD FOR CHANGING THE ALTITUDE OR POSITION OF A SPACECRAFT IN ORBIT

This is a file wrapper continuation of application Ser. No. 170,190 filed Mar. 18, 1988, now abandoned, which is a file wrapper continuation application of application Ser. No. 916,907 filed Dec. 8, 1986, now abandoned, which is a continuation of application Ser. No. 769,635 filed Aug. 26, 1985, now abandoned, which is a division of application Ser. No. 407,379 filed Aug. 12, 1982, now U.S. Pat. No. 4,575,029, which is a continuation of application Ser. No. 89,349 filed Oct. 30, 1979, now abandoned.

BACKGROUND OF THE INVENTION

This invention relates generally to space vehicles, and, more particularly, to spacecraft for carrying a payload, such as a satellite or space probe, from a first planetary orbit to a second operational orbit in which the payload will be used.

Since the inception of space flight, space vehicles, including space communication satellites, have been launched by means of expendable, rocket-powered vehicles, which were initially adaptions of vehicles used to carry ballistic missiles. These expendable rocket vehicles have imposed severe weight and size limitations on satellites and similar spacecraft. The limitations will no longer apply, however, when a launch vehicle known as the space transportation system, or space shuttle, becomes operational. The space shuttle is a reuseable vehicle about the size of a small jet airliner. It may be launched in a vertical orientation, like a rocket, using auxiliary rocket engines strapped to its fuselage, and will carry one or more satellites or other payloads in a payload bay up to a circular parking orbit at an altitude of approximately 160 nautical miles (300 km). For the return flight, the shuttle will first be slowed down by its own rocket engines, will re-enter the earth's atmosphere, and will land as a glider on a relatively long runway.

Although the space shuttle removes longstanding constraints on the weight and sizes of satellites, it also imposes new constraints, and poses new problems with respect to transporting a satellite or other spacecraft from the shuttle orbit to its operational orbit. The payload bay of the space shuttle is a generally cylindrical space approximately 60 feet (18.3 meters) long and 15 feet (4.6 meters) in diameter, and the cargo carrying capacity is approximately 65,000 pounds (29,480 kg). Typically, more than one user will share the shuttle on a single flight, and the cost of the mission to each user is determined from the greater of the weight ratio and the length ratio utilized by the user.

For example, if a user's payload occupied 15 feet (4.6 meters) of the length of the payload bay, and weighed 15,000 pounds (6,804 kg), the length ratio would be 15 divided by 60, or 25%, and the weight ratio would be 15,000 divided by 65,000, or approximately 23%. Accordingly, the user cost would be determined by the length ratio of 25%.

Clearly, this cost formula encourages spacecraft designers to make the length and weight ratios approximately equal. For most satellite designs, the result is that the satellite and its accompanying propulsion system must usually be designed to be as short as possible to make best use of the payload bay.

An even more important consideration is that the space shuttle will provide transportation to only a relatively low altitude of approximately 160 nautical miles (300 km). Most satellite missions require payloads to be transported to much higher orbits than this. Communication satellites, for example, typically operate in a geosynchronous orbit at approximately 19,000 nautical miles (35,000 km) altitude. Accordingly, a propulsion system must be provided to transport a payload, such as a satellite, from the parking orbit of the space shuttle to a higher operational orbit in which the satellite will operate.

Various configurations have been suggested for propulsion systems to transport such a payload to its operational orbit from the space shuttle. However, systems proposed prior to the present invention have a number of disadvantages in the context of space shuttle operations. Basically, the designs suggested to date for transporting a satellite to its operational orbit all utilize essentially the same principles as an upper-stage launch vehicle of the type widely used prior to the space shuttle. These upper stages, or payload assist modules as they are sometimes called, typically employ a relatively large solid-propellant rocket engine, which is initially burned at perigee, the lowest altitude point in an orbit elliptical orbit, transferring the payload to an orbit having an apogee at the desired operational orbit altitude. Either the same engine or a separate engine on the satellite itself is then burned at apogee to circularize the orbit at the desired altitude.

The principal disadvantage of this technique is that here is considerable unnecessary redundancy with respect to the propulsion or ascent module and the payload or satellite module itself. Each module is usually designed to be self-sufficient in terms of power supply, control systems, telemetry and communication systems, and so forth. The propulsion module functions as a self-sufficient spacecraft while in transition between the space shuttle and the operational orbit, after which the satellite or payload module then also functions as a self-sufficient spacecraft, and may in fact be separated from the propulsion module on arrival in the operational orbit. It will be apparent that this duplication of subsystems is extremely costly. It has apparently been thought to be necessary, however, to accommodate a wide range of missions for which the space shuttle will be utilized.

Another feature that all of the propulsion system designs so far suggested have in common is that the ascent from the shuttle parking orbit to the satellite operational orbit is made with basically only two rocket engine burns. While this technique is known to be the most efficient from a fuel consumption standpoint, it imposes severe design constraints on the satellite, since certain relatively fragile structural components, such as communication antennas or solar cell arrays, must be able to withstand substantial acceleration stresses if these components are to be deployed and checked out before departure from the vicinity of the space shuttle. Deploying such components before departure provides the options of repair, replacement, or return in the case of malfunctions.

It will be appreciated from the foregoing that there is presently a clear need for a spacecraft suitable for transporting payloads, such as satellites, from a low parking orbit to a higher operational orbit without any of the aforementioned disadvantages. Ideally, such a spacecraft should also be easily adaptable to a variety of mission-specific requirements, and should provide a "soft ride" utilizing relatively low accelerations, so that satellite components can be safely deployed and checked out before departure from the area of the space shuttle. The present invention is directed to these ends.

SUMMARY OF THE INVENTION

The present invention resides in a spacecraft for transporting a payload from a relatively low-altitude parking orbit of an orbiting space shuttle, to an operational orbit. A number of "housekeeping" functions common to both the spacecraft and the payload, such as communications, attitude control, power distribution, and telemetry and control, are integrated in such a manner that no duplication of equipment is needed to provide corresponding functions both while in the operational orbit and while in transition or ascent from the parking orbit to the operational orbit. Basically, and in general terms, the integrated spacecraft comprises a payload platform, including means for attachment of a variety of payload equipment modules for specific missions, and a propulsion system attached to the payload platform, including at least one relatively low-thrust bipropellant liquid rocket engine, and a plurality of fuel and oxidizer tanks disposed about the engine. Housekeeping subsystems for performing such functions as communication, attitude control, power distribution, and telemetry control, are integrated to provide these functions both while in the operational orbit and while in transition between the parking orbit and the operational orbit. It is contemplated that the spacecraft of the invention will provide, to some degree, a universal or standardized vehicle that is readily adaptable for use in a variety of missions, whether directed to earth-orbiting satellites or to interplanetary space exploration.

In accordance with a presently preferred embodiment of the invention, the housekeeping subsystems for the spacecraft and its payload are disposed on the spacecraft itself, referred to herein as the "shuttle bus" or the "bus", rather than on the payload. In this preferred embodiment, a user is provided with an interface at the payload platform of the bus, to provide all electrical, fluid, and other connections that may be required to communicate with the integrated housekeeping subsystems. In effect, then, the bus is a standardized vehicle in much the same manner sense that the space shuttle is a standardized vehicle, and the user need not be deeply concerned with the detailed design and construction of complex subsystems needed for the control of and communication with the payload vehicle. The interface between the bus and the payload is not, however, so standardized as to impose undue constraints on the user. Instead, the user can specify interface requirements, which can be appropriately supplied by modifications to the user interface, and to the housekeeping subsystems contained within the bus. The most significant aspect of the invention in this regard is that there is no duplication of housekeeping functions with respect to the two portions of the vehicle, but rather the functions are integrated into the bus itself.

Another important aspect of the invention stems from the inclusion of a liquid bipropellant rocket engine to supply a relatively low thrust to the spacecraft, and to thereby provide a relatively soft ride, i.e., using low levels of acceleration, so that various payload subsystems, such as antennas and solar arrays, can be deployed automatically or by astronauts before the spacecraft leaves the immediate vicinity of the space shuttle.

A related aspect of the invention resides in the technique employed to effect a transition from the parking orbit to the operational orbit. More specifically, the liquid propellant engine is first activated for a relatively brief first burn interval. This increases the velocity of the spacecraft and moves it into an an elliptical orbit of which the perigee, or lowest point, is approximately at the position where the burn took place. Then, a further succession of perigee burns are employed to move the apogee of the orbit further and further out from the original orbit. Finally, if the operational orbit is for a satellite, the engine is activated one or more times at the apogee of the orbit, to apply sufficient additional velocity to the spacecraft to circularize the orbit at the apogee altitude. A further apogee burn may then be necessary to change the plane of the orbit to a desired angle of inclination with respect to the equator. A similar sequence of burns may be employed to transfer to an interplanetary orbit, and a reverse sequence may be employed in some missions to return to the parking orbit.

In accordance with yet another aspect of the invention, propulsion for the spacecraft is provided by a propulsion system comprising a liquid propellant rocket engine disposed to provide thrust directed substantially through the center of mass of the spacecraft, a plurality of fuel tanks disposed about the rocket engine, and a like plurality of oxidizer tanks also disposed about the engine, in such a manner that each of the fuel tanks is balanced with respect to the center of mass by an oxidizer tank located closer to the center of mass than the corresponding fuel tank. In hypergolic rocket systems, in which fuel and oxidizer ignite spontaneously, the oxidizer is considerably more dense than the fuel, and the oxidizer tanks are therefore placed closer to the center of mass. The engine can then utilize staged tank pairs, each comprising a fuel tank and an oxidizer tank, which can be emptied sequentially, one pair at a time, and jettisoned with little or no lateral disturbance of the center of mass of the spacecraft. The purpose of jettisoning tanks is to reduce the total mass of the spacecraft, and therefore reduce propellant consumption needed to effect subsequent velocity changes.

In the presently preferred embodiment of the spacecraft, the fuel tanks are arranged in a symmetrical pattern about the rocket engine, and the oxidizer tanks are arranged in a similar symmetrical pattern, each being spaced between two adjacent fuel tanks. The fuel and oxidizer tanks can be approximately sized for specific missions, and may even be stacked in more conventional serial or tandem stage modules, one multi-tank stage module behind the other, for extended interplanetary missions.

In accordance with another aspect of the invention, the tanks are mounted on releasable hinges, and secured in part by quick-disconnect fluid flow connectors in the propellant lines from the tank. On jettisoning, the flow connectors are disconnected and the tank pivots about its hinges away from the central axis of the spacecraft. The hinges are so constructed as to release the tank completely after rotation through a preselected angular distance.

The spacecraft of the invention is preferably constructed to include a payload platform, on the forward side of which is attached the payload, and on the aft side of which are attached components of the spacecraft propulsion system, including the liquid propellant rocket engine and the fuel and oxidizer tanks. In the presently preferred embodiment of the invention, the payload platform is a sandwich-like structure comprising a forward face formed in an isogrid structure, i.e., as a plurality of equilateral triangles, and an aft face also in the form of an isogrid structure, but with the triangles substantially larger than those in the forward face.

A web or shear truss structure joins the forward and aft faces along lines corresponding to the principle members of the aft face of the platform. Equipment modules, containing housekeeping subsystems, are stored in some of the spaces between the forward and aft faces of the platform, and the overall structure provides strength, yet relative lightness in weight, and ease of access for electrical, fluid, and other connections between the bus and the payload portions of the vehicle. Being relatively large in area, the platform structure bridges almost the entire span between load-supporting sills in a payload bay of the space shuttle, thereby reducing the amount of additional mechanical support, and the total weight requirements, for a typical mission. The propulsion system, including the rocket engine and fuel and opxidizer tanks, are secured behind the aft face of the platform.

The entire spacecraft, including the platform structure, the propulsion system, and the payload, is supported on the sills in the space shuttle payload bay by side fittings on the platform and by similar fittings on an aft cradle structure. Additional fittings secure the cradle, and optionally the platform, to the keel of the space shuttle. The cradle is secured to the rear of the bus, and is releasably connected to the aft face of the platform by a structure that includes separation means such as screw jacks.

When the parking orbit is reached, the space bus and its payload are removed from the payload bay by first releasing the platform and keel attachment fittings, and then pivoting the entire structure, including the cradle, about the cradle sill fittings. Finally, the screw jacks are used to separate the bus from the cradle, and at the same time to impart a relatively low velocity to the bus, to move it clear of the space shuttle.

It will be appreciated from the foregoing that the present invention provides significant advantages over other suggested designs for transferring a payload from a space shuttle parking orbit to an operational orbit. In particular, it provides a practically standardized vehicle that may be easily adapted for use in a wide variety of missions, and provides for the integration of various housekeeping functions within the combined payload and bus spacecraft. It also provides for a low-acceleration "soft ride" from the space shuttle to the operational orbit, thereby allowing deployment of antennas and similar items prior to departure from the vicinity of the space shuttle. Other aspects and advantages of the invention will become apparent from the following more detailed description, taken in conjunction with the accompanying drawings.

BRIEF DESCRIPTION OF THE DRAWINGS

FIG. 1 is a simplified elevational view of a spacecraft constructed in accordance with the present invention, including a support cradle and removable side and bottom fittings to support the spacecraft in the space shuttle;

FIG. 2 is a composite view showing portions of both end elevations of the spacecraft shown in FIG. 1;

FIG. 2a is an enlarged elevational view, partly in section, of one of three screw-jack mechanisms used to separate the spacecraft from the support cradle;

FIG. 3 is an end elevational view of the same spacecraft shown in FIGS. 1 and 2, but showing more detail of the support cradle;

FIG. 4 is a side elevational view of an alternate embodiment of the spacecraft;

FIG. 5 is a simplified rear elevational view of the spacecraft shown in FIG. 4;

FIG. 9c is a sectional view of the hinge, taken substantially along the line 9c—9c in FIG. 9a;

FIG. 10 is a fragmentary enlarged view showing the isogrid structure forming the forward face of the payload platform of the spacecraft;

FIG. 11 is an enlarged sectional view taken substantially along the line 11—11 in FIG. 10;

FIG. 12 is an enlarged sectional view taken substantially along the line 12—12 in FIG. 10;

FIG. 13 is a fragmentary view of the aft face of the spacecraft platform shown to a smaller scale than FIG. 10;

FIG. 14 is an enlarged sectional view taken along the line 14—14 in FIG. 13;

FIG. 15 is a fragmentary view of a shear truss member between the two faces of the payload platform;

FIG. 16 is a sectional view of the shear truss member taken substantially along the line 16—16 in FIG. 15;

FIG. 17 is a simplified plan view of the shear truss member of FIG. 15, taken in the direction of the arrow 17 in FIG. 15;

FIG. 18 is an enlarged view, partly in section, showing the intersection of three shear truss members like those shown in FIGS. 15-17;

FIG. 19 is a view similar to FIG. 18, but taken substantially along the line 19—19 in FIG. 18;

FIG. 20 is a view similar to FIGS. 18 and 19, but taken substantially along the line 20—20 in FIG. 18;

FIG. 21 is a simplified plan view of a multi-node attachement mechanism for attaching a payload to the payload platform;

FIG. 22 is an enlarged sectional view taken substantially along the line 22—22 in FIG. 21;

FIG. 23 is a fragmentary sectional view of a single-node attachment mechanism for attaching a payload to the payload platform;

FIG. 24 is a simplified plan view showing an electrical and fluid line interface positioned within one triangular element of the forward face of the spacecraft platform; and FIG. 25 is a sectional view taken substantially along the line 25—25 in FIG. 24.

DETAILED DESCRIPTION

Figure 6:
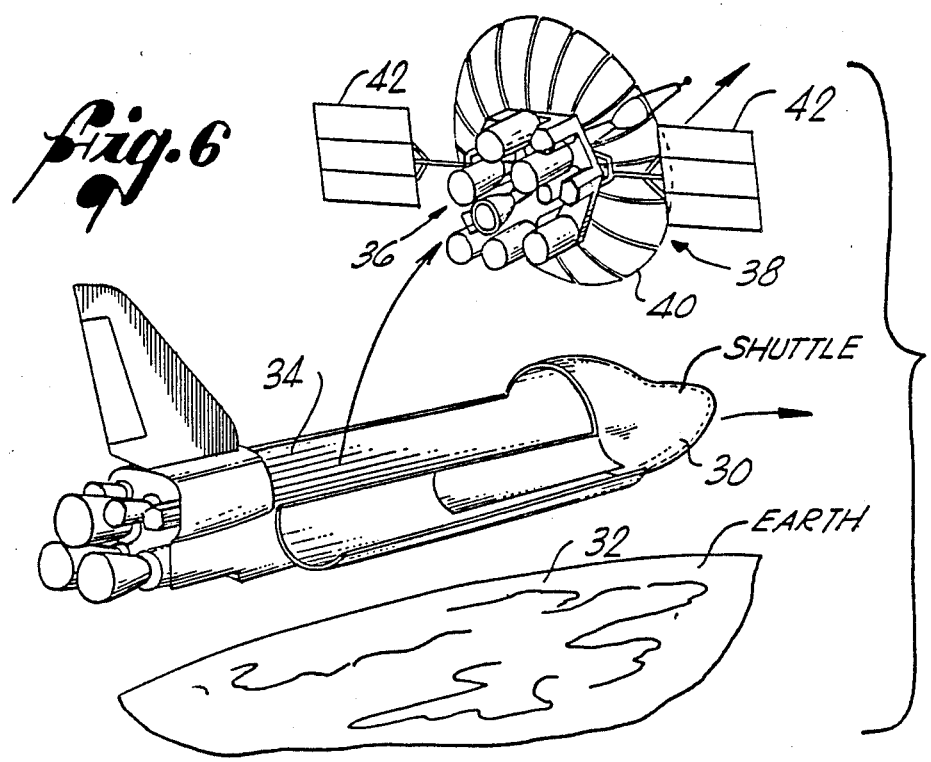
FIG. 6 is a simplified perspective view of the spacecraft shown in FIGS. 4 and 5, shown after unloading from the space shuttle and deployment of antennas and other arrays.

As shown in the drawings for purposes of illustration, the present invention is concerned with a multipurpose spacecraft for transporting a payload, such as a communication satellite, from a relatively low parking orbit in which it is placed by a space shuttle vehicle, to an operational orbit, which in general will be a much higher-altitude orbit around the earth, or an interplanetary orbit.

In the near future, it will be possible to launch a spacecraft by first transporting it to a relatively low parking orbit inside a reuseable vehicle known as a space shuttle. The space shuttle is about the size of a small jet airliner, which is launched in a vertical orientation, like a rocket, and returns to earth by gliding onto a long runway. While the space shuttle is in its parking orbits, doors in its fuselage will be opened and one or more payload vehicles will be removed from the shuttle before it returns to earth.

Although the low-altitude parking orbit increases the lifting capacity of the reuseable space shuttle, it is unsuitable for most missions involving satellites or for planetary exploration. Accordingly, some means must be provided for transporting a payload vehicle into its final operational orbit. Suggested designs advanced prior to this invention basically require the use of fairly conventional upper rocket stages to carry the satellite or other payload to its operational orbit. However, such schemes require costly duplication of various housekeeping subsystems, such as for control, power, guidance, and communications functions, and also subject the payload to relatively high accelerations during the ascent to the operational orbit. The result of this is that deployable appendages, like antennas, solar arrays, and sensors, must either be heavy to permit deployment in the vicinity of the space shuttle, or must be more complex, incorporating redundancy to assure reliable operation at a later stage in the mission.

In accordance with the present invention, an optimized spacecraft is provided to transport a payload on any of a variety of missions, and the housekeeping subsystems for the payload and the spacecraft, which is referred to as the bus, are integrated to avoid unnecessary duplication of these subsystems.

By way of background, FIG. 6 shows a space shuttle, indicated by reference numeral 30, shown in a parking orbit around the earth, indicated at 32. The shuttle 30 has a relatively large payload bay 34 in which a spacecraft bus 36 is transported, together with a payload vehicle 38, which is shown as including an antenna 40 and solar arrays 42. The bus 36 and payload 38 are shown immediately after removal from the shuttle payload bay 34. Since, in accordance with one aspect of the invention, the integrated spacecraft comprising the bus 36 and payload 38 is subjected to only very small accelerations, the antenna 40 and solar arrays 42, as well as other similar devices, can be deployed immediately after the spacecraft is removed from the space shuttle 30.

The term "payload" is defined in a general sense as the useful load that a vehicle of transport can carry. It will be appreciated that the term has two different meanings in the context of the present invention. First, there is the payload that is delivered to the operational orbit. This may be a satellite, or other "payload vehicle", and is not intended to include the spacecraft components used to transport the "payload" from the parking orbit to the operational orbit. An important aspect of this invention involves integrating and consolidating housekeeping subsystems such that common subsystems will be used both for the "payload vehicle" in operational orbit, and for the spacecraft used for transport from the parking orbit. Although this arrangement tends to confuse the issue of what the "payload" is, for purposes of this application the "payload" delivered to the operational orbit includes only those spacecraft components delivered to the operational orbit that were not used solely in the transition from the parking orbits.

A second meaning of "payload" is intended, of course, when the term is used with reference to the space shuttle. Anything that the shuttle delivers to its parking orbit and is not needed for operation of the shuttle itself is part of its payload.

FIGS. 1 and 2 show in more detail a particular preferred form of the bus 36. FIG. 1 shows the payload 38 only diagrammatically, since the payload may include a variety of different components designed for particular missions. The bus 36 includes a payload platform 44, on the forward side of which is secured the payload 38, and on the aft side of which are secured components of a propulsion system, including a centrally located rocket engine 46 and a plurality of fuel tanks 48 and oxidizer tanks 50, used to supply fuel and oxidizer to the rocket engine 46, which is a bipropellant liquid type. The engine 46 is secured on a tower-like frame structure 52 mounted on the aft face of the platform 44, and the fuel and oxidizer tanks 48 and 50 are also secured to the aft face of the platform by mechanical fasteners, not shown in FIG. 1 but discussed in relation to FIG. 9.

The fuel tanks 48 and oxidizer tanks 50 preferably utilize a pressurizing fluid contained in smaller tanks, one of which is shown at 54 in FIG. 1. Alternatively, pressurizing pumps could be employed, this being largely a matter of design choice. Also shown in FIG. 1 is the outline of a cradle 56 used to support the bus 36 and payload 38 in the shuttle payload bay 34.

The frame structure 52, which extends rearwardly from the platform 44, is connected to the cradle 56 by means of a corresponding frame structure 57 at three attachment points, one of which is illustrated in detail in FIG. 2a. In the presently preferred embodiment of the invention the attachment points between the platform frame structure 52 and cradle frame structure 57 are screw jacks. As shown in FIG. 2a, a forwardly projecting portion of the structure 57 includes a threaded shaft 57a journaled for rotation about an axis parallel with the fore-to-aft direction. The shaft 57a is engaged in a corresponding threaded bushing 52a when the spacecraft is secured to the cradle 56, forming a rigid support structure between the cradle and the platform 44.

When the spacecraft is secured in the payload bay 34, spacecraft loads are transmitted to the space shuttle 30 through pairs of side fittings 58a and 58b attached to the platform 44 and the cradle 56, respectively. Lateral loads are transferred through a keel fitting 59 on the cradle 56 and, optionally, through a similar keel fitting (not shown) on the platform 44. To deploy the spacecraft, the platform fittings 58a and the keel fitting 59 are released, and the spacecraft and cradle are rotated about the cradle fittings 58b until the spacecraft is pointing up out of the payload bay 34 at a desired angle. At this stage, various payload appendages can be deployed, and repaired if necessary, before separation from the space shuttle 30. Then the three screw-jack shafts 57a (FIG. 2a) are rotated together to separate the spacecraft from the cradle 56 at a relatively small velocity.

The cradle 56 serves the additional purposes of supporting the aft ends of the propellant tanks 48 and 50 for transport to the parking orbit. After separation from the space shuttle 30, the tanks 48 and 50 are cantilevered from the platform 44, as will be discussed in further detail.

FIG. 2 shows the structure of the platform 44 in more detail. The structure is best described as a multi-cellular sandwich with load-bearing faces, a forward face 60 and an aft face 62, shown in the left-hand and right-hand halves, respectively of FIG. 2 interconnected by shear webs except along their outer edges. All internal stucture is open grid lattice for ease of accessibility, and nodal intersections inherently provide predictably located attachment points. The preferred construction is of the integral isogrid type. This type of structure has been employed on other spacecraft, such as the "skylab" manned orbiting satellite, and comprises a plurality of integral structural ribs so arranged as to form a number of adjoining equilateral triangles. Preferably, the isogrid structure is machined from a solid planar sheet of some lightweight material, such as aluminum or an aluminum alloy, to reduce cost and splice weight penalties.

In the particular embodiment shown in FIG. 2, the forward face 60 of the platform 44 generally takes the form of a large equilateral triangle with the corners cut off to form three additional shorter sides, making six sides in all around the exterior edge of the face 60. There is a similarly shaped six-sided opening in the center of the forward face 60. Thus it will be seen that the forward face 60 of the platform 44 has three adjoining legs, each with a width of four rows of small triangles. The corner sections of the forward face 60 have a width of six triangles. It will be understood, of course, that the size and number of the triangular elements is largely a matter of design choice. The isogrid structure of the forward platform 60, in addition to providing an extremely rigid support for the payload, also provides a large number of openings through which connections may be made from one side of the face 60 to the other. Furthermore, it provides a large number of strong attachment points where isogrid structural ribs intersect in a "peg-board" pattern, for support of a variety of payload components.

The aft face 62 of the platform 44 is best shown in the right-hand half of FIG. 2, and also employs isogrid structural principles, but utilizing fewer and larger triangular elements than in the forward face 60. The larger openings provide better accessibility to the interior of the structural cells, where equipment may be mounted. Not clearly shown in FIGS. 1 and 2 is a platform shear truss structure 68, which structurally joins the forward and aft faces 60 and 62 of the platform 44. As will be discussed in greater detail below, the shear truss structure 68 comprises a series of members located at positions corresponding to the sides of the larger triangles in the aft platform face 62. However, there are no elements of the shear truss structure 68 at the external edges of the platform 44. Therefore, the spaces between the forward and aft faces 60 and 62 can be reached from the outside edge for storage of equipment modules, shown at 70.

The equipment modules 70 house the subsystem equipment necessary to control operations of both the bus 36 and the payload 38. Thus, the bus 36 is effectively integrated with the payload 38, and the combined unit operates as a single spacecraft, both during transition from the parking orbit to the operational orbit, and while in the operational orbit.

FIGS. 24 and 25 show one form of an interface between the payload 38 and the equipment modules 70. Electrical and fluid connections are made through a trianglar interface panel 72 sized to fit within one of the triangular spaces in the forward face 60 of the platform 44. The panel 72 is shown by way of example to include a plurality of electrical connectors 74, and two or more fluid connectors 76. The triangular panel 72 has three corner lugs 78 by means of which the entire interface assembly may be attached to nodes, or points of intersection, of the forward face 60. The interface assembly may be affixed to the forward face 60 at any desired location, depending upon the requirements for specific payloads and missions.

One important advantage of the invention is that the aforedescribed structure of the platform 44 and the cradle 56 can remain substantially the same for all missions. For various mission velocity requirements, the propellant tanks 48 and 50 can be varied in length to provide appropriate quantities of propellant material. The ends of the tanks 48 and 50 can be identical for all tank sizes, and only the size of the tower-like frame structures 52 and 57 would need to be changed, to accommodate various tank lengths.

Figure 7:
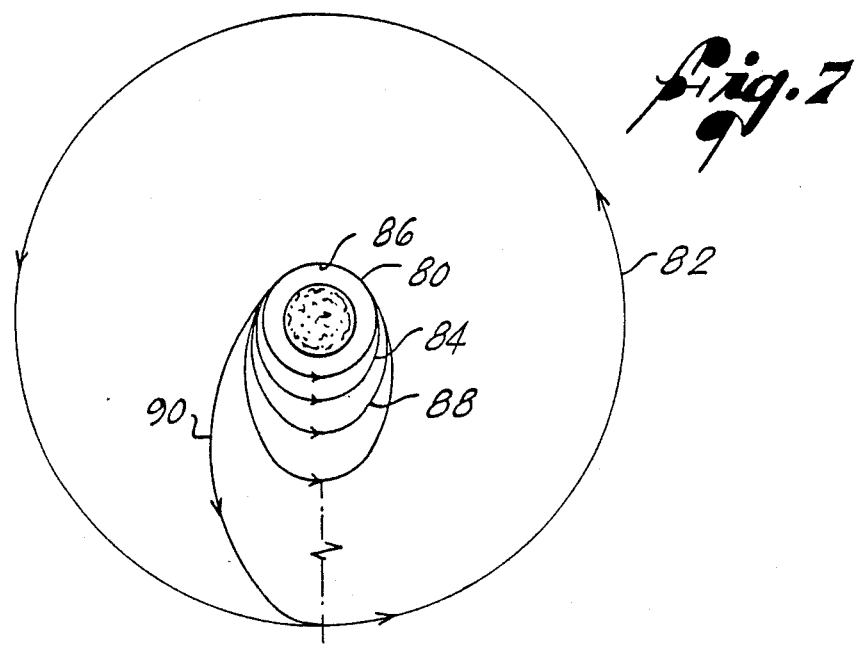
FIG. 7 is a diagrammatic view showing the orbital transition of the spacecraft from a shuttle parking orbit to an operational orbit.
Figure 8:
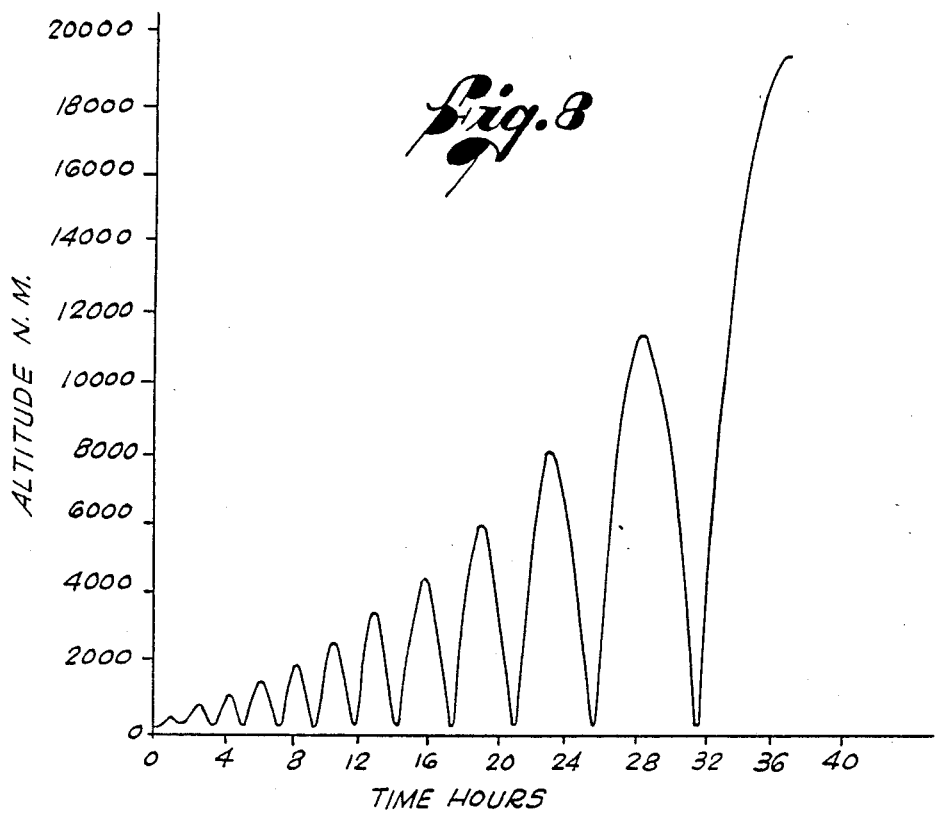
FIG. 8 is a graph showing the spacecraft altitude plotted with respect to time, and corresponding to the orbital transition shown diagrammatically in FIG. 7.

In accordance with one aspect of the invention, the bus 36 and payload 38 are transferred from the parking orbit, which is indicated diagrammatically at 80 in FIG. 7, to an operational orbit 82 utilizing only very low accelerations, typically not more than three-tenths of a gravity (0.3 g). To implement this "soft-ride" capability, the liquid bipropellant rocket engine 46 is first activated for a relatively short burn period, while in the parking orbit 80, to place the integrated spacecraft in an elliptical orbit, shown at 84. When the spacecraft again approaches the perigee point in its new orbit, which point corresponds approximately to the initial burn position 86, a second burn takes place, and the integrated spacecraft moves to a more elliptical orbit 88. Successive perigee burns at approximately the same point 86 in the orbit, move the apogee of the orbit further and further out into space, and provide for increasingly greater velocities at the perigee. A final perigee burn places the spacecraft in the orbit shown at 90, the apogee of which corresponds to the desired altitude of the operational orbit 82. Finally, one or more apogee burns circularize the orbit as shown. An additional apogee burn may be required to change the plane of the orbit to some desired inclination angle different from that of the original parking orbit. Typically, twelve perigee burns will be required to make the transition from the parking orbit to a geosynchronous orbit, in which the spacecraft's period of rotation about the earth is twenty-four hours. FIG. 8 shows graphically how the altitude of the spacecraft varies with respect to time during the transition from the parking orbit to the operational orbit.

The aforedescried sequence of short, low-thrust burns is practically as efficient as a single, short, high-thrust burn, the only disadvantage arising when the time for transition between the parking and operational orbits is of significance. Prolonged exposure to radiation in the Van Allen belts has been thought to be reason enough for avoiding slow transitions to higher orbits. However, more recent observations indicate that the effects of longer exposure to radiation in the Van Allen belts is insignificant when compared with the effects of long-term exposure while in the operational orbit.

It will be appreciated that this sequence of burns is exemplary only, and relates specifically to earth-orbiting satellite missions. Other desired orbits, including interplanetary orbits, can be attained utilizing short perigee burns to achieve a "soft-ride" transition from the parking orbit. Moreover, the burn sequence can be reversed for missions requiring retrieval of a payload from its operational orbit, or to attain a satellite orbit about some other planetary body. Such a reverse sequence would include one or more apogee burns to locate the perigee at the desired parking orbit altitude, followed by a series of perigee burns to circularize the orbit again.

Control of the attitude of the bus 36 is effected by means of conventional reaction control thrusters 91 (FIG. 2) mounted on outrigger frames 92 attached to the platform and arranged to provide reaction control forces in any desired direction. The thrusters 91 control the attitude of the bus 36 during ascent from the shuttle orbit, as well as while in the operational orbit.

FIG. 3-5 show a slightly different embodiment of the bus, indicated by the reference numeral 36'. The bus 36' includes a payload platform 44', a liquid propellant rocket engine 46', three fuel tanks 48', and three oxidizer tanks 50'. The platform 44' has a front face 60' and a rear face 62', which differ from the previously discussed platform faces only in that the shape of the platform is substantially hexagonal instead of being an irregular six-sided figure. As in the previously described embodiment there is a cradle 56' for supporting the bus 36' and payload 38 in the payload bya 34. One minor additioanl difference is that there is a centrally disposed fuel tank 48" and a centrally disposed oxidizer tank 50" secured in co-axial relationship with the motor 46'.

In accordance with another important aspect of the invention, the fuel tanks 48 (or 48') and the oxidizer tanks 50 (or 50') are arranged in balanced pairs to allow for staging and jettisoning of each pair as the fuel and oxidizer is used up. Since, in a hypergolic liquid fuel system, the oxidizer material is considerably more dense than the fuel material, a pair of tanks comprising an oxidizer tank and fuel tank could not be spaced opposite each other and equidistant from the center of mass of the spacecraft unless it were balanced by other fuel-oxidizer pairs. Even if it were so balanced, the depletion of one pair of tanks would result in a lateral movement of the center of mass of the spacecraft.

In the bus of the invention, each oxidizer tank 50 is placed closer to the center of mass than the corresponding fuel tank 48, so that each oxidizer-fuel-tank pair is completely balanced about the center of mass, even as the fuel and oxidizer are depleted. In the embodiments illustrated, the fuel tanks 48 or 48' are arranged in a triangular pattern about the center of mass, and the oxidizer tanks 50 or 50' are arranged in a smaller triangular pattern, placing the oxidizer tanks closer to the center of mass than the fuel tanks. The tanks are used in a series of staged pairs and, after each pair of tanks is emptied, it is jettisoned by means of a tank mounting structure like that shown in FIG. 9. Unbalance caused by jettisoning of each asymmetrically placed tank pair can be minimized by careful location of the pressurizing tanks 54, to provide a balanced empty-tank configuration, the pressurizing tanks also being jettisoned at the same time as the propellant tanks.

Figure 9:
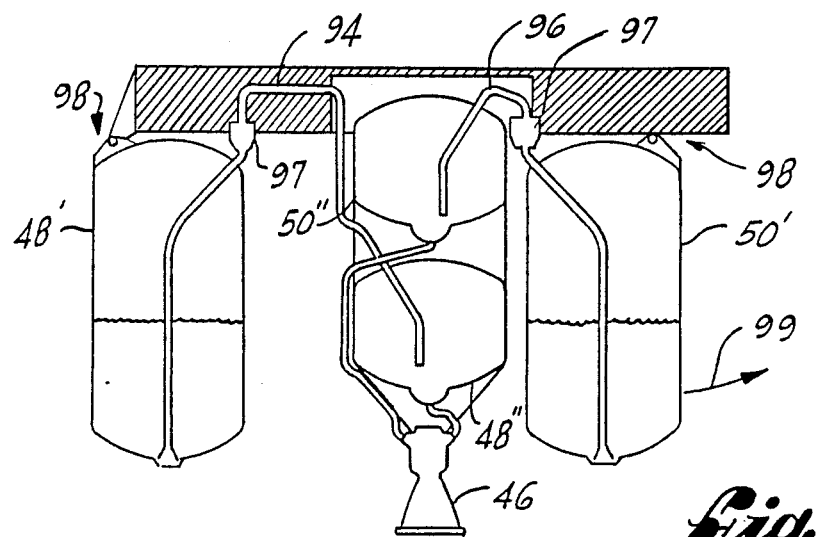
FIG. 9 is an enlarged view of a staged tank pair comprising a fuel tank and an oxidizer tank on the spacecraft.

FIG. 9 shows a pair of tanks, a fuel tank 48' and oxidizer tank 50', in relation to the central pair of tanks 48" and 50" of the FIG. 4 embodiment. The central tanks, being aligned with the axis of symmetry of the spacecraft, will be balanced about that line and can be used first. Then the pair of tanks shown at 48' and 50' supply fuel and oxidizer through lines 94 and 96, respectively, into the corresponding central tanks 48" and 50", and thence to the rocket engine 46. The tanks 48' and 50' are secured to the platform 44' by combined quick-disconnect and ejection units 97 and by pivotal mounts 98, of which there are two for each tank. When the tanks are empty, they can be pivoted on the mounts 98, as indicated by the arrow 99, and jettisoned one to each side of the spacecraft. If the central tanks 48" and 50" are not employed, as in the embodiment of FIGS. 1 and 2, two central chambers or plenums of much smaller size than the central tanks receive fuel and oxidizer liquid from the currently employed pair of tanks, to convey it to the engine 46. In this manner, parallel staging of fuel tanks is accomplished while utilizing a single rocket engine, and thereby keeping the axial length of the spacecraft to a minimum, as is typically required for efficient and low-cost usage of the shuttle payload bay 34.

Figure 9A:
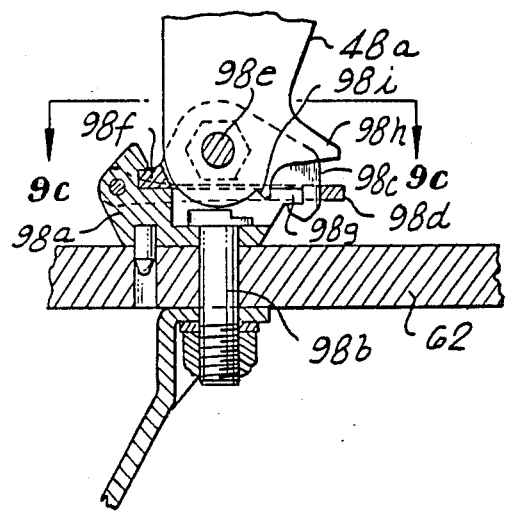
FIG. 9a is an enlarged elevational view, partly in section, of one of two releasable hinges used to secure each propellant tank to the spacecraft.
Figure 9B:
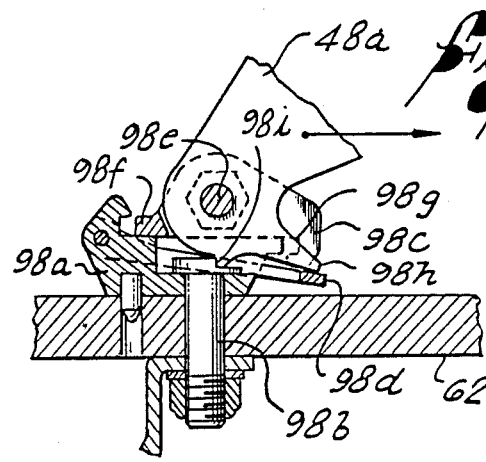
FIG. 9b is a view similar to FIG. 9a, but showing the hinge pivoted to its releasing position.
Figure 9C:
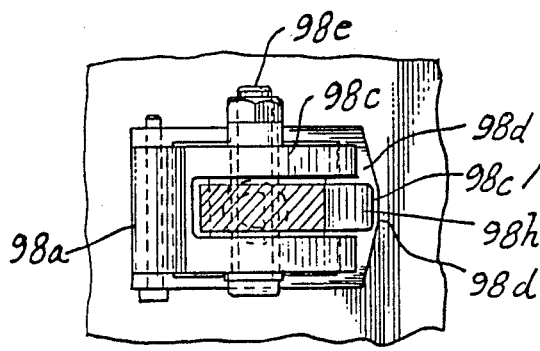

Of course, it will be appreciated that various other configurations of tank pairs are possible. In all such configurations, the principle of using balanced tank pairs is believed to contribute significantly to the successful operation of the spacecraft of the invention. In cases where propellant requirements are low, the modular grouping of the propellant tanks permits the omission of a pair of tanks, to provide a two-stage propulsion system, or the omission of two pairs of tanks to provide a single-stage pair. Omission of tank pairs in this manner has the additional advantage of increasing useable storage space. Another option that may be desirable for some missions is to operate the spacecraft using balanced pairs of propellant tanks, but not to jettison any of the tank-pair stages. One of the pivotal mounts 98 shown only diagrammatically in FIG. 9 is illustrated in more detail in FIGS. 9a-9c. Basically each pivotal mount 98 is an ejectable hinge release mechanism for securing a hinge leg, indicated at 48a, of a tank 48, to the aft platform face 62, only a portion of which is shown in FIGS. 9a and 9b. Other principal elements of the pivotal mount 98 include a base 98a, a bolt 98b, which secures the base to the rear platform face 62, a hinge clevis 98c, and a locking hasp 98d.

The hinge clevis 98c has a clevis pin 98e disposed through it and through a corresponding hole in the hinge leg 48a and inludes a locking lug 98f and a notch 98g formed thereon, sized and spaced to engage with complementary features on the base 98a, such that the clevis can be released from the base only by movement in one direction, to the right as shown in the drawings. The locking hasp 98d is separately pivoted on the base 98a and is normally held in a position surrounding the clevis 98c and preventing its release from the base.

When a tank 48 is to be jettisoned, the quick-disconnect and ejection unit 97 (FIG. 9) is actuated to disconnect the fluid lines to the tank, and at the same time to impart rotational velocity to the tank. As the hinge leg 48a rotates, clockwise as shown in FIGS. 9a and 9b, a projecting arm 98h contacts the hasp 98d and forces it out of its locking position, thereby releasing the clevis 98c for lateral movement.

To ensure a clean ejection of the tank, a lug 98i on the hinge leg 48a is provided and, as the hinge leg continues to rotate, the lug contacts a corresponding shoulder on the head of the bolt 98b, to pry the clevis 98c out of the base 98a, using the lug 98i as a pivot. When the locking lug 98f and notch 98g are free, as shown in FIG. 9b, the hinge leg and clevis are completely released and the tank is thereby jettisoned laterally from the spacecraft.

The quick-disconnect and ejector mechanism 97 is a conventional device for releasably connecting one or more fluid lines, and the design details are not shown. Basically, the mechanism comprises a fluid coupling of which the two halves must be held in axial compression, typically by a clamp band, to maintain fluid communication. When the clamp band is released, the two halves spring apart and spring-loaded check valves in each half operate to seal off the flow of escaping fluid. Operation of springs in the check valves, supplemented by other compression springs provided in the mechanism, imparts sufficient axial force to separate the two halves and to pivot the tank 48 about the pivotal mounts 98.

FIGS. 10-12 illustrate in more detail the isogrid structure of the forward face 60 of the platform 44. It will be seen that each element of the isogrid structure is rectangular in cross-section and forms one side of each of two adjoining equilateral triangles. Where the elements of the structure intersect, at the nodes indicated by reference numeral 102, holes are bored for the attachment of the payload and other components. Although the isogrid structure forming the forward face 60 of the platform 44 is preferably machined as a single piece, FIGS. 10 and 12 show a preferred technique for joining separate sections of the isogrid structure, should this be necessary. In particular, the structure is separable close to a line of nodes 102, in such a manner as to preserve the integrity of the nodes and the holes formed in them, for use as payload attachment points. The join may be effected by thinning of each of the two adjoining elements, which are then lapped and secured by a fastener such as a bolt 104 close to each node 102.

FIGS. 13 and 14 show in more detail the structure of the aft face 62 of the platform 44. As already mentioned, this face of the platform is also an isogrid structure, only of coarser elemental size. In the example illustrated, each triangular element of the rear platform face 62 encompasses sixteen smaller triangular elements of the front face 60. It will also be seen that the preferred cross-sectional shape of the aft platform members is T-shaped, and that the members intersect at aft face nodes 106.

FIGS. 15-17 illustrate the structure of the shear truss assembly 68. Again, each shear truss member is initially cut from a single piece of material, although individual members may be cut to form intersections of the shear truss assembly. Basically, a member of the shear truss assembly comprises a plurality of attachment plates 107 for attachment to the forward platform face 60, a plurality of similarly sized attachment plates 108 for attachment to the aft platform face 62, a plurality of generally square or rectangular plates 110 spaced midway between the forward and aft faces and midway between adjacent attachment plates, in a longitudinal sense, and a plurality of diagonal bracing members 112 extending between the attachment plates and corners of the square plates 110. Thus, the diagonal bracing members 112 define a series of parallelograms between the forward and aft faces 60 and 62. The use of a truss, rather than a web, preserves the openness of the platform structure and provides ample opportunities for placement of wiring and other communication paths. Moreover the shear truss structure lends itself to manufacture in a continuous strip, which can be cut to required lengths. Each of the square plates 110 has a circular opening 114 in it, and a plurality of surrounding screw holes 116. As will shortly be described, the square plates 110 and the openings 114 therein are utilized to join intersecting members of the entire shear truss assembly.

FIGS. 18-20 show in detail how joining of shear truss members is accomplished utilizing a metal ball 120 of approximately the same diameter of the openings 114 in the square plates 110. As FIG. 18 shows, three intersecting truss members are secured by the ball 120 operating in conjunction with a locking band 122. As shown in FIG. 19, one of the intersecting members of the truss assembly is unbroken and extends completely through the intersection, the ball 120 being positioned in the opening 114 of the corresponding square plate 110 in the truss member that extends completely through the intersection. The other two intersecting truss members are cut at the intersection as shown at FIG. 20, and are secured against the ball by means of the locking band 122.

FIGS. 21-23 provide examples of how the nodes 102 of the forward platform face 60 may be used to secure payload components. FIG. 21 shows a multi-node attachment having three uniformly spaced legs 130 which attach to three adjacent nodes 102 in the forward face 60, and which provide a central attachment point 132 for securing to a payload component, as shown at 134 in FIG. 22. The multi-node attachment may be made utilizing fastners, such as nuts and bolts 136, having an insulated sleeve 138 and employing a heat insulating layer 139 between the platform elements 60 and the attachment legs 130, to minimize heat transfer between the bus 36 and the payload 38. By way of further example, FIG. 23 shows a single-node attachment bolt 140 utilizing a shock-resistant mount or bushing 142 on each side of the attachment node 102.

It will be appreciated from the foregoing that the present invention represents a significant advance in the design, construction, and operation of sapcecraft used in conjunction with the space shuttle. In particular, the invention provides a standardized and optimized system for transporting payloads, such as satellites, from the shuttle parking orbit to a higher or interplanetary operational orbit, and uses housekeeping subsystems integrated to avoid redundancy. Moreover, ascent to the operational orbit is effected at relatively low accelerations, to allow components of the payload to be deployed before departure from the vicinity of the shuttle. In addition, staging of fuel and oxidizer tanks in balanced pairs preserves the center of mass of the integrated spacecraft and provides for a relatively short-length vehicle for efficient storage in the payload bay of the shuttle. The standardized features of the bus also permit adaptation to a wide range of missions, using a wide range of spacecraft sizes.

Although specific embodiments of the invention have been described in detail for purposes of illustration, it will be appreciated that various modifications may be made without departing from the spirit and scope of the invention. Accordingly, the invention is not to be limited except as by the appended claims.

We claim:

1. A method of transporting a payload on a spacecraft from a low-altitude parking orbit around a planetary body to a higher-altitude operational orbit, said method comprising the steps of:
   actuating a low-thrust liquid bipropellant rocket engine for a relatively short period at a preselected point in the parking orbit, and thereby increasing the velocity of the spacecraft at the preselected point in the orbit; and
   actuating the rocket engine for a succession of burns each time the preselected point in the orbit is reached, the preselected point becoming the perigee of an elliptical orbit of which the apogee moves further from the earth after each successive burn;
   whereby the operational orbit is reached by a succession of relatively short burns producing relatively low levels of accelaration.

2. A method as set forth in claim 1, and further including the step of actuating the rocket engine for an additional burn at apogee, to circularize the orbit at a desired altitude.

3. A method as set forth in claim 1, and further including the steps of:
   consuming fuel and oxidizer liquids during the rocket engine burns from a balanced pair of tanks;
   jettisoning the balanced pair of tanks as the pair is emptied; and then
   switching fuel and oxidizer supply lines to draw propellants from a next balanced pair of tanks.

4. A method as set forth in claim 3, wherein said jettisoning step includes temporarily closing off a propellant feed system to prevent loss of propellent while jettisoning the tanks.

5. A method of transporting a payload on a spacecraft from an operational orbit to a low-altitude parking orbit around a planetary body, said method comprising the steps of:
   actuating a low-thrust liquid bipropellant rocket engine for at least one burn at a preselected point in the operational orbit, to decrease the velocity of the spacecraft at that point in the orbit and place the spacecraft in an eliptical orbit about the planetary body such that the preselected point is the apogee of the eliptical orbit; and
   actuating the rocket engine for a succession of burns occuring at the perigee in the eliptical orbit, and thereby decreasing the velocity of the spacecraft at perigee until the orbit is circular at perigee altitude;
   whereby the parking orbit is reached by a succession of relatively short burns producing relatively low levels of acceleration.

6. A method of transporting a payload on a spacecraft from a low-altitude circular parking orbit to a higher-altitude operational orbit, said method comprising the steps of:
   accelerating the spacecraft to a higher velocity at a preselected point in the parking orbit, thereby moving the spacecraft into an elliptical orbit having a perigee at the preselected point and an apogee higher than the original parking orbit;
   accelerating the spacecraft to a slightly higher velocity each time the perigee is reached, thereby extending the apogee to a higher and higher altitude; and then
   accelerating the spacecraft once more at a time when apogee is reached, to circularize the orbit at a desired altitude, whereby only relatively small accelerations may be used, and components of the payload may be deployed before departure from the parking orbit.

7. A method as set forth in claim 6, wherein:
   said accelerating steps include burning a low-thrust liquid bipropellant rocket engine and consuming fuel and oxidizer liquids from a balanced pair of fuel and oxidizer tanks; and
   said method further includes the steps of jettisoning the pair of tanks as it is emptied, and switching fuel and oxidizer supply to draw propellants from another balanced pair of tanks.

8. A soft ride method for changing the position of an orbiting satellite comprising the steps of:
   selecting an orbital location for commencing a soft ride change in orbital position;
   providing a relatively low acceleration thrust;
   altering the velocity of said satellite; and
   repeating said thrust until a desired orbital position is achieved.

9. A soft ride method for changing the altitude of a satellite in space comprising the steps of:
   (a) utilizing a relatively low acceleration thrust in order to alter the rotation or translation of said satellite; and
   (b) repeating said thrust until a desired altitude is achieved.

10. A spacecraft for transporting a payload from a low-altitude parking orbit around a planetary body to a higher-altitude operational orbit, the spacecraft comprising:
   (a) means for attaching the payload to the spacecraft;
   (b) a low-thrust liquid bipropellant rocket engine; and
   (c) control means for (i) actuating the engine for a relatively short period at a preselected point in the parking orbit, and thereby increasing the velocity of the spacecraft at the preselected point in orbit, and for (ii) actuating the rocket engine for a succession of relatively short burns each time the preselected point in orbit is reached, the preselected point becoming the perigee of an elliptical orbit at which the apogee moves further from the earth after each successive orbit, the relatively short burns producing relatively low levels of acceleration.

* * * * *